United States Patent
Rittweger et al.

[19]

[11] Patent Number: 5,915,890
[45] Date of Patent: Jun. 29, 1999

[54] METHOD AND DEVICE FOR INFLUENCING THE RUN OF DEEP HOLE DRILLED PASSAGES

[75] Inventors: Wolfram Rittweger; Heinz-Michael Zaoralek, both of Königsbronn, Germany

[73] Assignee: Schwäbische Hüttenwerke GmbH, Aalen-Wasseralfingen, Germany

[21] Appl. No.: 08/776,527

[22] PCT Filed: Aug. 28, 1995

[86] PCT No.: PCT/EP95/03389

§ 371 Date: May 27, 1997

§ 102(e) Date: May 27, 1997

[87] PCT Pub. No.: WO96/06701

PCT Pub. Date: Mar. 7, 1996

[30] Foreign Application Priority Data

Aug. 28, 1994 [DE] Germany .............................. 44 30 331

[51] Int. Cl.⁶ .............................. B23B 35/00; B23B 25/02
[52] U.S. Cl. .............................. 408/1 R; 408/56; 408/83; 408/147
[58] Field of Search ................................ 408/1 R, 79, 80, 408/81, 83, 147, 705, 56

[56] References Cited

U.S. PATENT DOCUMENTS

| | | |
|---|---|---|
| 3,635,108 | 1/1972 | Prince . |
| 5,451,126 | 9/1995 | Brun ......................................... 408/1 R |
| 5,544,985 | 8/1996 | Lane ........................................... 408/56 |
| 5,788,433 | 8/1998 | Grund et al. ................................. 408/56 |

FOREIGN PATENT DOCUMENTS

| | | |
|---|---|---|
| 767 138 | 11/1951 | Germany . |
| 33 08029 A1 | 9/1984 | Germany . |
| 37 20837 A1 | 10/1987 | Germany . |
| 37 05852 A1 | 9/1988 | Germany . |

Primary Examiner—Daniel W. Howell
Assistant Examiner—Rouzbeh Tabaddor
Attorney, Agent, or Firm—Armstrong, Westerman, Hattori, McLeland & Naughton

[57] ABSTRACT

For influencing the run of a deep hole drilled passage in a metallic or non-metallic material a pusher pad (6) variable in strength and position is interposed between the drill rod (2) driving the drill tool (1) or the drill tool (1) itself and the inner wall of the drilled passage so that it causes a bending of the drill rod such that the drill tool assumes a changed run. The variation in the position and/or thickness of the pusher pad (6) can be fed back to the sensing of the corresponding position of the drill tool (1) and controlled by the results of sensing.

15 Claims, 3 Drawing Sheets

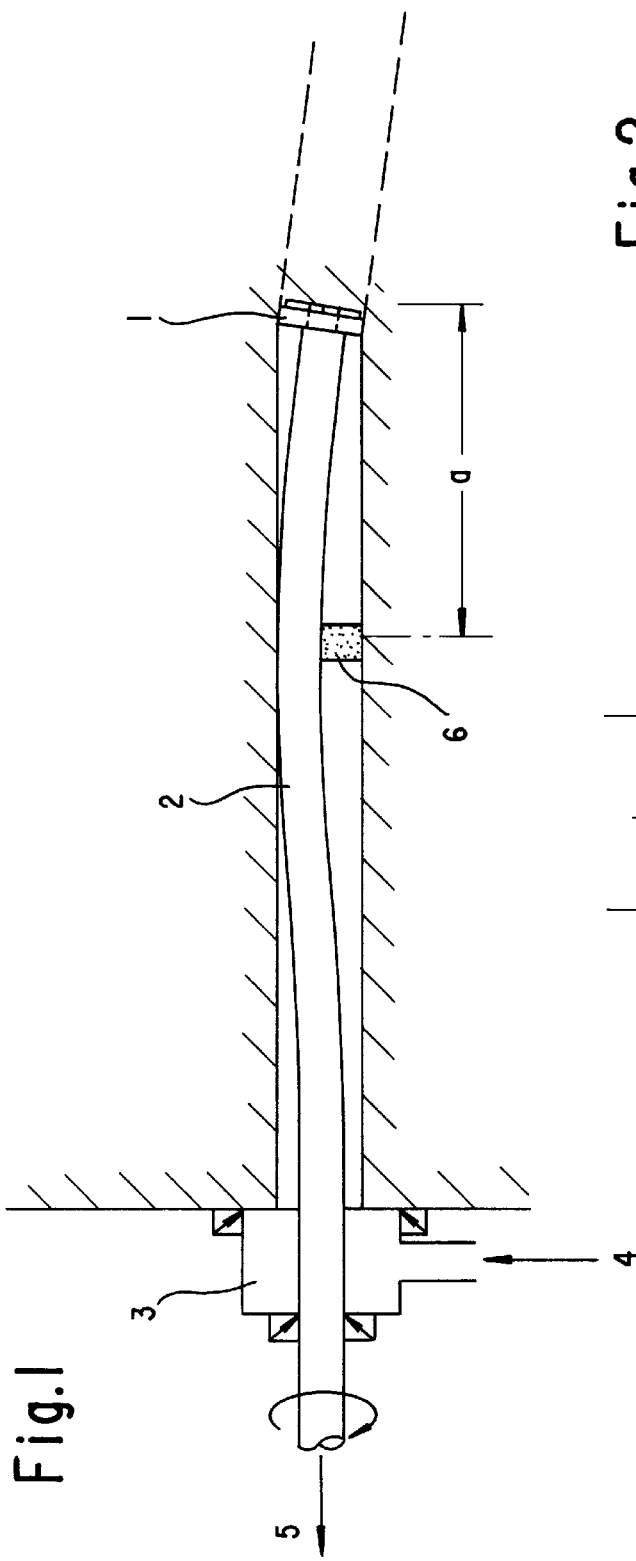
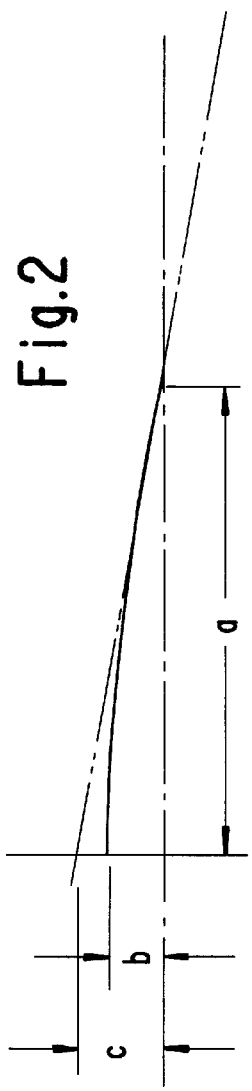

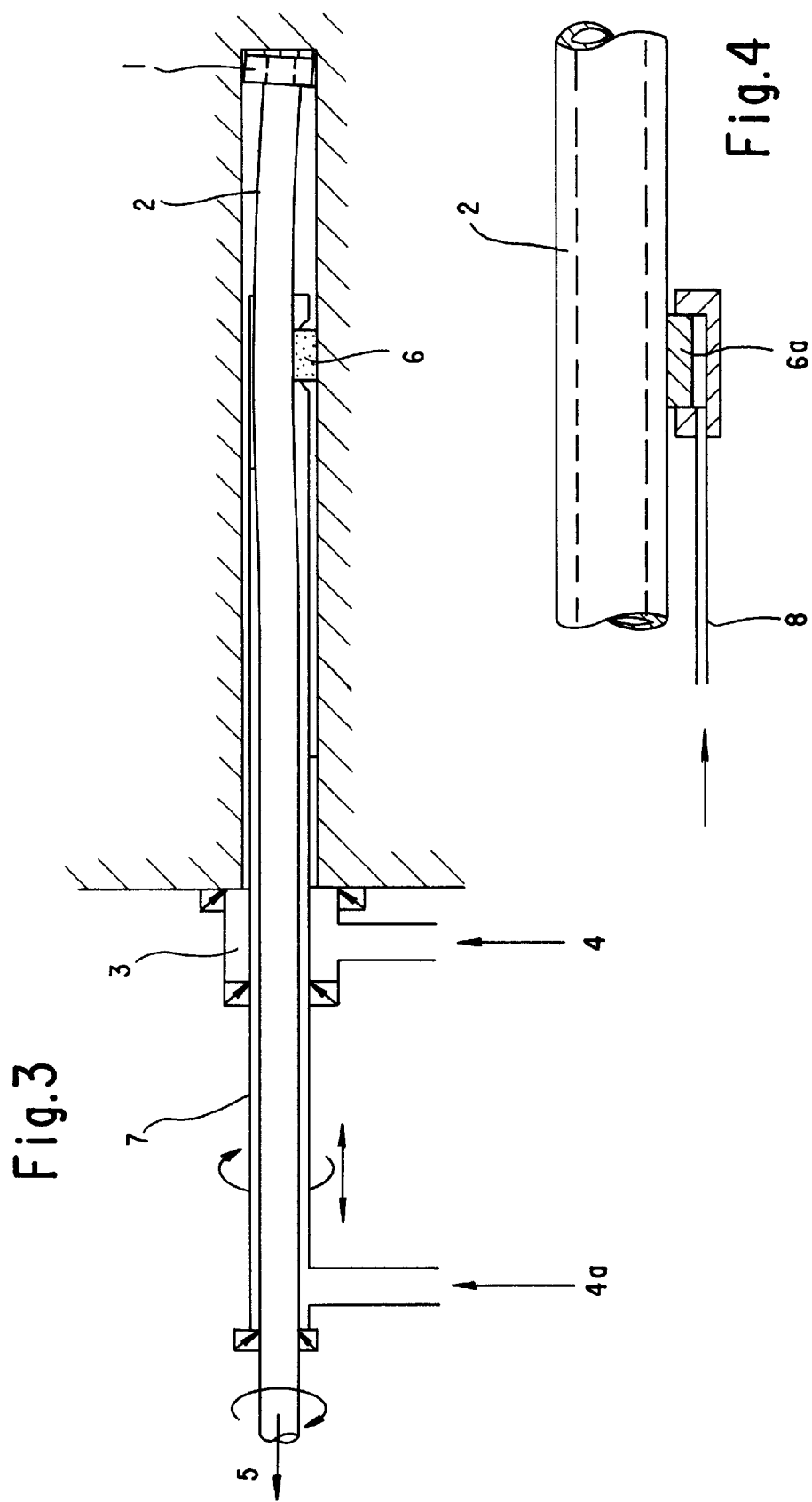

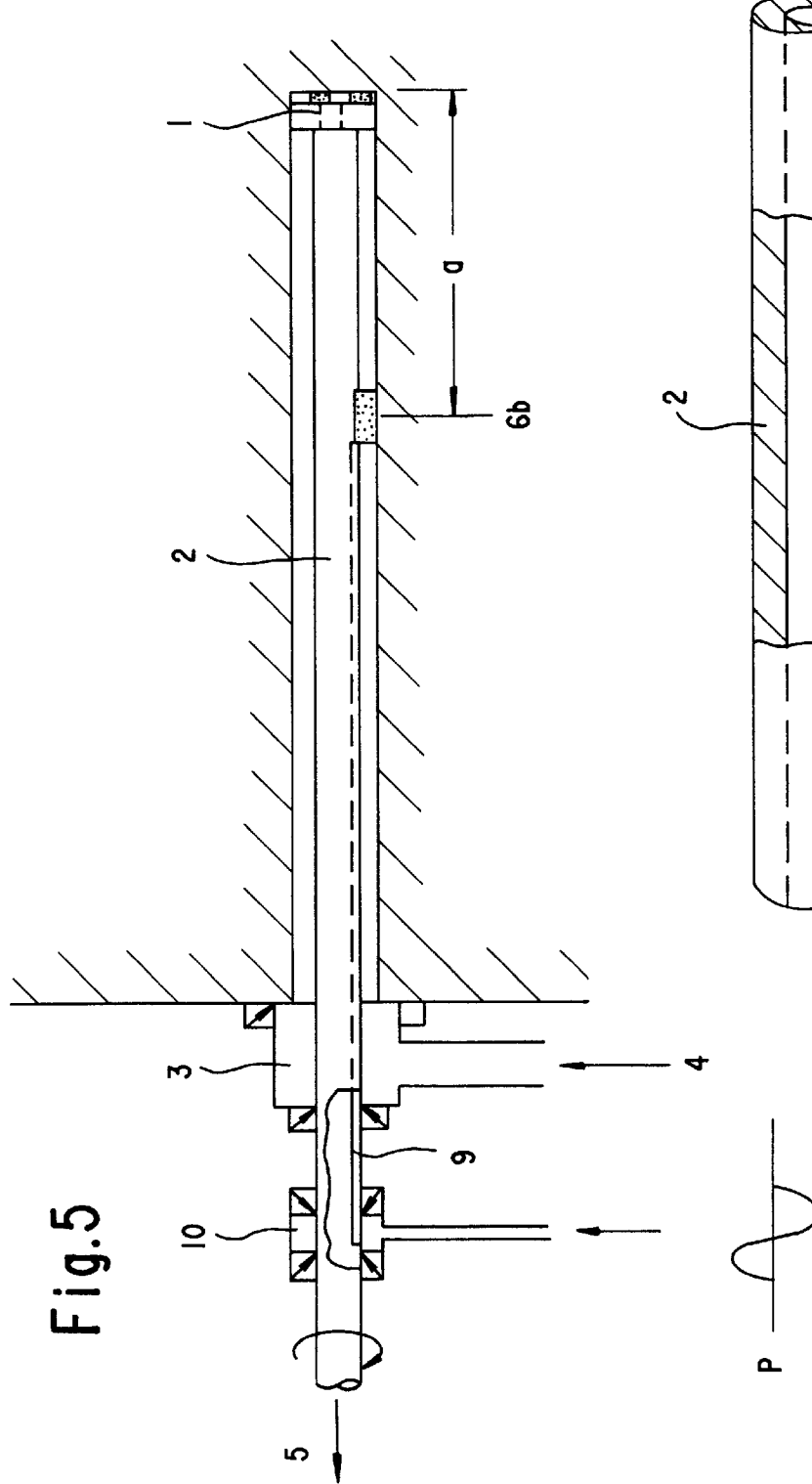
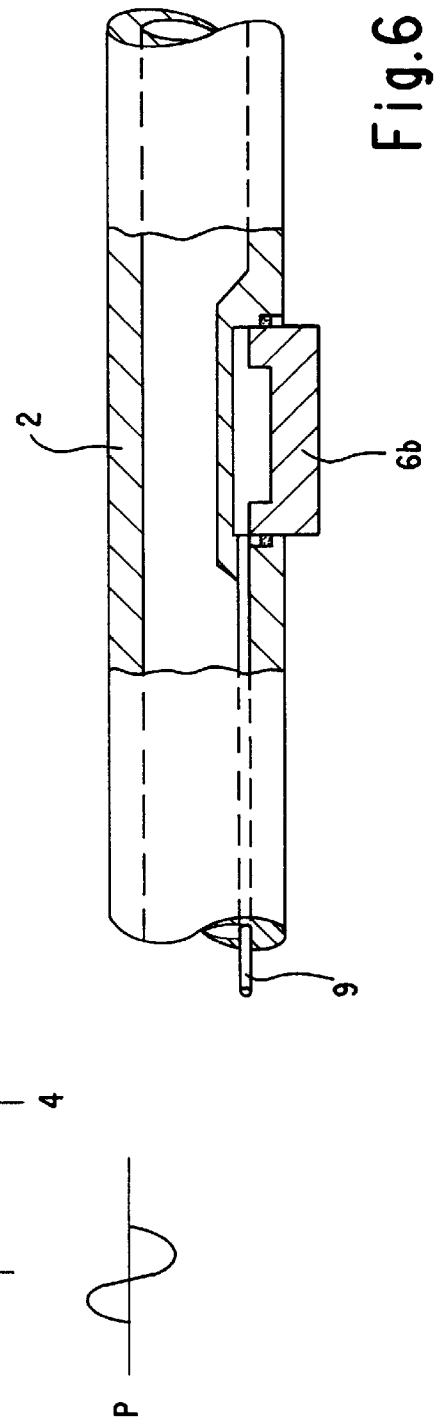

METHOD AND DEVICE FOR INFLUENCING THE RUN OF DEEP HOLE DRILLED PASSAGES

Machining straight deep hole drilled passages oriented as precisely as possible in metal objects is sufficiently commanded by the so-called gun-barrel drilling method for a ratio of roughly 1:100 of diameter to drilling depth. However, improving the directional stability and straightness of the drilled passage even in this range still leaves something to be desired.

Where very long and narrow drilled passages are concerned, as well as in the case of materials lacking homogenity, deflection of the drilled passages, i.e. the deviation from the ideal run, is particularly a problem. This is explained in the following by way of the example of so-called peripherally drilled heated rolls as employed in papermaking and paper finishing techniques.

In rolls of this type it is desirable for axially parallel drilled passages located just beneath the roll surface to handle the passage of a fluid heat transfer medium and to thereby bring the roll surface to an elevated operating temperature, as a result of which improvements in quality and economy of production in making and finishing paper and other web materials are achieved. Relative to the cross-section of the roll these peripheral drilled passages represent singular sources of heat. To achieve a roll surface temperature as homogenous as possible, as many peripheral drilled passages as possible having a diameter as small as possible are of advantage. This applies also to the thermal deformation of the cross-section of the roll in operation.

A typical calender roll of this type has, for instance, a roll diameter of 1,350 mm for a length of the roll body of 8,000 mm. Roughly 45 peripheral drilled passages having a diameter of 32 mm are arranged on a pitch circle of 1,220 mm diameter. In such a roll the peripheral drilled passages need to be drilled in two steps from both ends of the roll respectively up to roughly the middle of the roll. However, it is often not possible to dimension them so that the cited diameter/drilling depth ratio of 1:100 can be maintained, which is why the drilled passages "wander", i.e. depart from the straight line connecting input and output to a degree which is intolerable, and in differing directions—to the side (in the direction of the most adjacent drilled passage) to the roll surface or to the roll center in a combination of the cited deviations also spirally or totally undefined.

It goes without saying that a satisfactory flow of the heat transfer medium requires the corresponding drilled passages to meet as best possible in the middle of the roll, there being in addition a variety of reasons to be cited why the peripheral drilled passages need to be as straight as possible.

Especially in the case of calender rolls of chilled cast iron, a material which is used with preference, a tendency of the drill to "dive" into the roll is observed, i.e. the drilled passages are spaced further away from the surface at the middle of the roll than at the ends of the roll. As a result, in heated operation of the roll lower surface temperatures occur in the middle of the roll due to the heat flow being confronted by a greater resistance in the form of a greater wall thickness.

Another effect viewed as being undesirable is that runs of drilled passages dispersing individually introduce imbalance in the rolls, especially at the position where they have the worst effect on the balance of the rolls, namely in the middle of the roll. This, together with the deterioration in true rotation, may cause the roll to vibrate at high operating speeds and be a serious detriment to proper operation of the machine.

The main cause of the drill "diving" is the structure of the chilled cast iron roll which exhibits an extremely hard "white" shell and a softer "gray" core. Although care is taken to ensure quenching being restricted as best possible so that the peripheral drilled passages can be arranged in the "gray" zone of the cross-section of the roll, the quenching effect of the molds extend beyond the "white" shell. The strength of the structure of the "gray" zone is all the more, the further outwards it is measured. In addition, isolated microscopically small hard carbid inclusions are more frequent further outward than inwards, thus resulting in the drill coming up against a greater resistance outwardly than inwardly, i.e. it deflecting in the direction of the softer material.

Attempts have been made to counteract "diving" by drilling initially in the direction of the roll surface from the end of the roll, the drilled passage initially approaching the surface over the first 1,000 to 2,000 mm before the direction of drilling is returned in the direction of the roll center. This trick achieves significant improvements. However, in the case of roll bodies exceeding a length of 8,000 mm the result is not satisfactory.

Unavoidable tolerance ranges in the material and tool parameters (spot drilling, geometry, wear, etc) also result in dispersions in the run of the drilled passage, the governing laws of which are not always predictable. This can then lead to hot spots on the surface of the roll. The roll bends due to the differences in thermal expansion and runs less true.

Even in homogenous material drilled passages tend to wander away from a straight line which increases as the square of the drilling length. The cause of this is probably due to the circumstances that the drill rod, which has a somewhat smaller diameter than the drill head, deflects under the drilling pressure on attaining the free buckling length. The drill rod then wobbles in the drilled passage and the guides of the drill head automatically lose their effect. One indication that this assumption applies is evident from the fact that at lower drilling pressure a better straight line of the drilled passage can be achieved due to the deflection then occurring later. However, a lower drilling pressure results in an undesirable extension in the duration of drilling.

Not many proposals are known as to how the run of deep hole drilled passages can be improved. One such proposal has the end effect of uncoupling the deflection of the drill rod from the direction of the drill tool by providing the front part of the drill rod with a further set of guide beads roughly 500 mm behind the drill head which are in contact with the wall of the drilled passage to then create a "soft" connection to the remaining drill rod required to absorb the wobble movement thereof. This design fails to bring any noticable improvement, however.

Another proposal provides for superimposing the pressure of the drilling fluid serving to lubricate and to carry away the chips with a pressure pulse having the frequency of rotation to thus repeatedly impart a thrust in the same direction to the drill tool. It is not known whether this proposal has ever become anything more than a trial.

Both solutions are also unsuitable already in theory to correct a spot-drilling error at the commencement of drilling.

A device for machining deep hole drilled passages in a metallic on non-metallic material is known from DE-C-767138. The drawback in this device is that the run of the deep hole drilled passage cannot be influenced as regards deflection.

From DE-C-3720837 it is known to provide a deflection control for drill heads. The correcting device described herein is employed to achieve as little deflection as possible or zero deflection in the run of the deep hole drilled passage. Effectively influencing the run of deep hold drilled passages, more particularly a variable run, is not provided for in accordance with the device described in this document.

By means of the invention as described in the following, it is possible to effectively influence the run of machined deep hole drilled passages. In this arrangement both a device, which is continually effective during drilling, and further continually affects the direction of drilling in response to gauging the drilling run, find application.

The invention will now be described in more detail with reference to FIG. 1 by way of an example of a gun-barrel drill having a drill head (1) diameter of 38 mm. The rotary drive of the drill head is achieved by means of a hollow drill rod (2) having an outer diameter of 28 mm and an inner diameter of 18 mm. The drilling fluid (4) is supplied pressurized to the drill head (1) via a feeder (3), the so-called DOF (drilling oil feeder) in the gap between drilled passage and drill rod (2). The chips are removed with the drilling fluid (5) flowing off through the inner drilled passage of the drill rod.

The described direction in the flow of drilling fluid has the advantage that the drill head is guided in fluid free of chips thus resulting in the guides being exposed to less wear. Also known is a so-called single lip drill in which the oil feed is made through the drill rod. In this case a DOF can be eliminated. For the invention itself this difference is, in principle, immaterial.

As described above, for a correspondingly free drill rod length (drilling depth), in the absence of any further means, the drill rod (2) would, in any case, deflect and then wobble uncontrolled in the drilled passage.

In accordance with the invention this wobble movement is inhibited by a pusher pad (6) inserted in the gap between drilled passage and drill rod (2) resulting in the drill rod (2) being specifically bent to force the drill head in a desired direction. The functioning thereof will now be illustrated by way of an example of an initially straight drilled passage of 38 mm diameter in which the correcting device in accordance with the invention is made use of to effectively urge the drill away from the straight direction. It will, of course, be appreciated that the actual practical application of the invention is to return an already running drilled passage into the desired direction or respectively to inhibit any wandering as soon as it starts to develop.

In the selected example (FIGS. 1 and 2) the pusher pad (6) is positioned in a recess of a guide tube (not shown) with a spacing a=500 mm from the drill head (1) so that it is in contact on one side with the drilled passage wall itself, and on the other side the 28 mm thick drill rod (2) is forced against the opposite drilled passage wall. It results from the bending line of the drill rod (FIG. 2) that at the drill head an angle corresponding to a triangle materializes, the base of which equals the spacing of the pusher pad from the drill head a, and the height of which equals 1.5 times the deflection c. Extrapolated to a drilling path of a further 1,000 mm the correction in the example illustrated would then amount to 9 mm assuming the drill continues to drill in the new direction.

The magnitude of this correction can be influenced either by using a pusher pad which is not so thick or by altering the spacing of the pusher pad from the drill head.

A continual change in the spacing of a pusher pad (6) of constant thickness from the drill head (1) is effected by the arrangement shown in FIG. 3 in which the guide tube (7) is additionally illustrated. The guide tube is configured to be axially movable irrespective of the position of the drill head (1). For this purpose the guide tube (7) is guided by the DOF (3) and is sealed off with respect to the drill rod further to the rear. The drilling fluid (4) can then be supplied via the DOF as well as directly into the guide tube (4a).

In this case it is good practice to provide an axially movable drive for the guide tube with which the latter is normally moved in synchronism with the feed of the drill head. To alter the correction, the synchronisation is interrupted and the spacing readjusted.

Preferably, as illustrated in FIG. 4, a pusher pad (6a) may be used, the thickness of which can be altered continuously or incrementally. This may be done, for instance, by means of a thin hydraulic conduit (8) passing through the guide tube (7) up to the pusher pad (6a) which is then configured, for example, as a hydraulic ram or a pressure cushion. Other technical solutions for altering the thickness of the pusher pad, such as e.g. by shifting a wedge, driven either by electrical or mechanical means, for raising the pressure pad are contemplated. Suitably combining the position and thickness of the pusher pad results in considerably expanded means of influencing the drilling depth which will not be discussed further since these are appreciated by the person skilled in the art in applying the technical rules and calculations known to him in the art.

By rotating the guide tube (7) in the direction of the arrow indicated at (5) in FIG. 3 or opposite to this direction it is possible to bring the pusher pad (6) into any radial angular position with respect to the roll body, thus making corrections to the run of the drilled passage possible in any direction. The reason for this being particularly of advantage is that, when drilling in a clear-chilled casting, the described lack of homogenity of the material has the additional effect of causing the drill to also wander circumferentially. This, together with the "dive" of the drill, is termed the "two o'clock effect," due to the result of both deviations pointing in the direction two on a clock dial when a deep hole is produced in the six o'clock position relative to the cross-section of the roll. It is thus good practice, in view of this effect to apply the pusher pad expediently in an eight o'clock position to totally eliminate drill wander.

However, the ability of the guide tube (7) to rotate in influencing the correcting direction has a far greater significance in that it makes it possible to correct the wandering of the drill in all directions in response to the particular circumstances involved.

In accordance with a further aspect of the invention, as shown in FIGS. 5 and 6, it is possible to dispense with the guide tube when the pusher pad (6b) is integrated in the drill rod (2). The pressure of the pusher pad (6b) on the wall of the drilled passage is varied at the frequency of rotation for example by a hydraulic conduit (9) running separately in the drill rod (2), this hydraulic conduit being connected to a pressure variator (not shown) via a rotary bush guiding (10). Influencing the drilling depth in this way is, however, less effective than that described above due to the desired bending of the drill rod (2) being achieved only during part of its rotation by it being located in wobbling at the side of the drilled passage wall facing away from the deviation error of the drilled passage.

Totally controlling the run of the drilled passage is attained in that the momentary position of the drill head is sensed at regular intervals or continually. This can be done e.g. by ultrasonic means or other means of proximity sensing effective in a metal body. From the feedback of the sensed deviations to the correcting means an almost ideal straight run of the drilled passage, as well as any given curve in the drilled passage, can be automatically generated. The devices and methods in accordance with the invention are also particularly suitable for mechanical and/or electronic means of automatically correcting the run.

It will be appreciated that all devices and methods presently illustrated are, of course, not restricted to rolls of chilled cast iron, and the like, as used in papermaking mentioned in the present merely by way of example to make things clear. These devices and methods are principally applicable in all cases in which long and relatively thin drilled passages need to be incorporated in a hard material which must not necessarily be of a metallic nature without the possibility existing of automatically guiding the drill head so that it keeps to a straight line or to any other given direction sensed possible.

We claim:

1. A machining device for influencing the run of deep hole drilled passages in a metallic or non-metallic workpiece comprising:

a machining drill tool including one or more cutting edges, said tool being positively connected to the tip of a rotatably driven hollow drill rod, said drill rod having an outer diameter smaller than the diameter of a drilled passage produced by said drill tool, means for feeding a fluid into a gap between said drill rod and a wall of said passage produced by said drill tool for cooling and lubricating said drill tool and for removing chips and discharging said fluid together with said chips through said hollow drill rod, and a pusher pad positioned between said drill rod and the inner wall of said drilled passage at a distance behind said drill tool, said pusher pad bearing against said wall of said passage and said drill rod to exert a force on said drill rod and affecting a radial deflection of said drill rod in a predetermined direction.

2. The device as set forth in claim 1, including means mounting said pusher pad, said means being operative to guide said pusher pad axially and angularly with respect to said drilled passage, and means accessible from the exterior of said drilled passage connected to said pusher pad and operative to move said pusher pad within said drilled passage.

3. The device as set forth in claim 2, in which said means connected to said pusher pad from the exterior of said drilled passage is a guide tube extending from said drilled passage through said drilling fluid feeding means, and said feeding means is sealed both with respect to the workpiece and to the guide tube.

4. The device as set forth in claim 3, in which said guide tube for said pusher pad is sealed off outside of said drilled passage with respect to said drill rod, and said drilling fluid is selectively supplied to said drill tool between said guide tube and said drill rod.

5. The device as set forth in claim 2, in which said pusher pad is integrated in said drill rod to rotate together therewith, and means for periodically varying the force of said pusher pad at the frequency of rotation of said drill rod.

6. The device as set forth in claim 2 including means for varying the force exerted by said pusher pad on said drill rod.

7. The device as set forth in claim 1, including means for varying the force exerted by said pusher pad on said drill rod.

8. The device as set forth in claim 7 in which said force varying means includes means or varying the effective thickness of said pusher pad.

9. The device as set forth in claim 1, wherein a distance between said drill head and said pusher pad substantially equals zero.

10. The device as set forth in claim 9 in which said pusher pad is installed in said drill head.

11. A machining method for influencing the run of deep hole drilled passages in a metallic or non-metallic material, comprising the steps of:

subjecting a drill rod driving a drill tool to a bending force, and providing a pusher pad disposed between said drill rod and a wall of said passage, and means for varying the effective thickness of said pressure pad to thereby effectively adjust the bending of said drill rod with respect to said drilled passage.

12. The method as set forth in claim 11, including the steps of:

providing a guide tube in spaced surrounding relation to said drill rod, and moving said guide tube selectively longitudinally and rotationally for guiding and adjusting said pusher pad.

13. The method as set forth in any one of claims 11 or 12, including the step of:

varying the effective thickness of said pusher pad by means of fluid driven means.

14. The method as set forth in any one of claims 11 or 12, including the step of:

varying the position and pressure-producing capability of said pusher pad by manual control in accordance with a predetermined design run in response to a sensed position of said drill tool.

15. The method as set forth in any one of claims 11 or 12, including the step of varying the position and pressure-producing capability of said pusher pad by automatic control in accordance with a predetermined design run in response to a sensed position of said drill tool.

* * * * *